United States Patent
Ishikawa

(10) Patent No.: US 10,562,251 B2
(45) Date of Patent: Feb. 18, 2020

(54) TIRE MOLD

(71) Applicant: SUMITOMO RUBBER INDUSTRIES, LTD., Kobe-shi, Hyogo (JP)

(72) Inventor: Masanori Ishikawa, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 16/219,544

(22) Filed: Dec. 13, 2018

(65) Prior Publication Data
US 2019/0193356 A1  Jun. 27, 2019

(30) Foreign Application Priority Data
Dec. 27, 2017 (JP) ................. 2017-251407

(51) Int. Cl.
*B29D 30/06* (2006.01)
*B29L 30/00* (2006.01)

(52) U.S. Cl.
CPC .. *B29D 30/0629* (2013.01); *B29D 2030/0607* (2013.01); *B29L 2030/002* (2013.01)

(58) Field of Classification Search
CPC ................................. B29D 30/0629
USPC ........................................... 425/46
See application file for complete search history.

(56) References Cited

U.S. PATENT DOCUMENTS

| 3,741,696 A * | 6/1973 | Greenwood | B29D 30/0629 425/47 |
| 3,852,006 A * | 12/1974 | Irie | B29D 30/0629 425/46 |
| 3,867,504 A * | 2/1975 | Greenwood | B29D 30/0629 264/315 |
| 3,910,735 A * | 10/1975 | Caretta | B29D 30/0605 425/40 |
| 4,828,471 A * | 5/1989 | Schlautmann | B29D 30/0629 425/29 |
| 5,120,209 A * | 6/1992 | MacMillan | B29D 30/0606 264/326 |
| 6,520,760 B1 * | 2/2003 | Canevini | B29D 30/0629 152/454 |
| 9,056,436 B2 * | 6/2015 | Yaguchi | B29D 30/0629 |
| 2014/0377392 A1 | 12/2014 | Yaguchi | |

FOREIGN PATENT DOCUMENTS

JP  2013-144414 A  7/2013

* cited by examiner

*Primary Examiner* — James P Mackey
(74) *Attorney, Agent, or Firm* — Birch, Stewart, Kolasch & Birch, LLP

(57) ABSTRACT

A mold 6 includes multiple segments 24 arranged in the circumferential direction so as to form a ring shape, and a pair of side plates 26, 28 positioned on an inner side in the radial direction, at end portions, in an axial direction, of the multiple segments 24. The side plates 26, 28 respectively have outer circumferential surfaces 26b, 28b which contact with the multiple segments 24 arranged in the ring shape. Each of the segments 24 includes a first contact surface 36 which contacts with the outer circumferential surface 26b of the upper side plate 26, and a second contact surface 38 which contacts with the outer circumferential surface 28b of the lower side plate 28. A radius R1 of the first contact surface 36 is greater than a radius R2 of the second contact surface 38.

19 Claims, 6 Drawing Sheets

TIRE MOLD

This application claims priority on Patent Application No. 2017-251407 filed in JAPAN on Dec. 27, 2017. The entire contents of this Japanese Patent Application are hereby incorporated by reference.

BACKGROUND OF THE INVENTION

Field of the Invention
The present invention relates to tire molds.
Description of the Related Art
JP2013-144414 discloses a tire mold. The mold includes multiple tread segments (hereinafter, referred to as segments) and a pair of side plates. In a tire vulcanization step, an unvulcanized raw cover (green tire) is prepared. The raw cover is put into a mold. The raw cover is pressurized and heated in the mold, whereby a tire can be obtained from the raw cover.

In this vulcanization step, the multiple segments are arranged in the circumferential direction so as to form a ring shape. Each of the side plates contacts with the multiple segments forming the ring shape. The multiple segments and the pair of side plates form a cavity for molding a tire. A tread surface of the tire is formed by the multiple segments, and sidewall outer surfaces of the tire are formed by the pair of side plates.

In the tire vulcanization step, a rubber composition of the raw cover flows by being pressurized and heated. In the mold having a gap between the segments and the side plates which contact with each other, the rubber composition flows into the gap. Similarly, in the mold having a gap between the segments which contact with each other in the circumferential direction, the rubber composition flows into the gap. The rubber composition having flowed into the gaps forms a so-called overflow spew (rubber spew) on the outer surface of a tire.

The mold is repeatedly used. As a result of the repeated use, wear of the contact surfaces of the segments and the contact surfaces of the side plates progresses. This progress of wear increases a gap between the contact surfaces. In the mold having a large gap, large overflow spew may be generated. The overflow spew deteriorates the outer appearance of the tire.

An object of the present invention is to provide a tire mold for molding a tire having an excellent outer appearance.

SUMMARY OF THE INVENTION

A tire mold according to the present invention includes: multiple segments arranged in a circumferential direction so as to form a ring shape; and a pair of side plates positioned on an inner side in a radial direction, at end portions, in an axial direction, of the multiple segments. The side plates each have an outer circumferential surface which contacts with the multiple segments arranged in the ring shape. Each of the segments includes a first contact surface which contacts with an outer circumferential surface of one of the side plates, and a second contact surface which contacts with an outer circumferential surface of the other of the side plates. A radius R1 of the first contact surface is greater than a radius R2 of the second contact surface.

Preferably, a central angle θ1, at the first contact surface, of each segment is less than a central angle θ2, at the second contact surface, of the segment.

Preferably, a central angle θ of each segment is gradually reduced, toward one end, in the axial direction, at which the first contact surface is positioned, from the other end in the axial direction, at which the second contact surface is positioned.

Preferably, a difference (θ3−θ1) between a central angle θ3, at an equator plane, of each segment and the central angle θ1 is greater than a difference (θ2−θ3) between the central angle θ3 and the central angle θ2.

Preferably, a difference (θ2−θ1) between the central angle θ2 and the central angle θ1 is not less than 0.003° and not greater than 0.006°.

Preferably, a difference (R1−R2) between the radius R1 and the radius R2 is not less than 0.05 mm and not greater than 0.10 mm.

A method, for producing a tire according to the present invention, includes:
a putting-in step of putting a raw cover in a mold; and
a pressurizing and heating step of pressurizing and heating the raw cover in the mold to obtain a tire from the raw cover, in which
the mold includes
multiple segments arranged in a circumferential direction so as to form a ring shape, and
a pair of side plates positioned on an inner side in a radial direction, at end portions, in an axial direction, of the multiple segments,
the side plates each have an outer circumferential surface which contacts with the multiple segments arranged in the ring shape,
each of the segments includes a first contact surface which contacts with an outer circumferential surface of one of the side plates in an axial direction, and a second contact surface which contacts with an outer circumferential surface of the other of the side plates in the axial direction, and
a radius R1 of the first contact surface is greater than a radius R2 of the second contact surface.

In the tire mold according to the present invention, a great contacting force is inhibited from locally acting between the segments or between the segments and the side plates. In the mold, wear is inhibited from locally increasing. The mold allows occurrence of overflow spew to be inhibited. With the tire mold, a tire having an excellent outer appearance can be molded.

DESCRIPTION OF THE PREFERRED EMBODIMENTS

The following will describe in detail the present invention based on preferred embodiments with reference where appropriate to the accompanying drawing.

Figure 1:
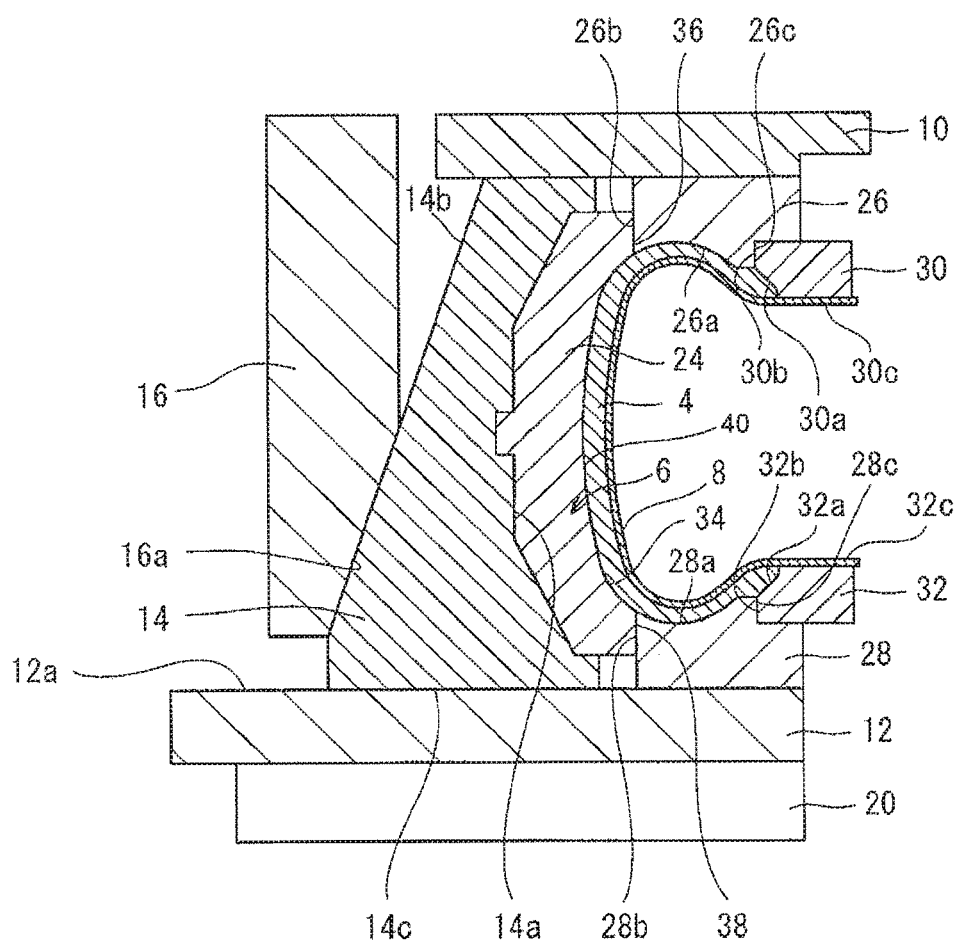
FIG. 1 is a conceptual diagram showing a tire vulcanization device according to one embodiment of the present invention.

FIG. 1 shows a vulcanization device 2 and a tire 4 having been vulcanized and molded. The vulcanization device 2 includes a mold 6, a bladder 8, an upper plate 10, a lower plate 12, multiple sectors 14 as tread sectors, an actuator 16, and a lower platen 20. The vulcanization device 2 further includes an upper platen and a press base (not illustrated). In FIG. 1, the left/right direction corresponds to the left/right direction of the vulcanization device 2, the direction perpendicular to the surface of the drawing sheet corresponds to the front/rear direction of the vulcanization device 2, and the up/down direction corresponds to the up/down direction of the vulcanization device 2.

The mold 6 in FIG. 1 includes multiple segments 24 as tread segments, an upper side plate 26 and a lower side plate 28 as a pair of side plates, an upper bead ring 30 and a lower bead ring 32 as a pair of bead rings. In FIG. 1, the left/right direction corresponds to the radial direction of the mold 6, the up/down direction corresponds to the axial direction of the mold 6, and the direction perpendicular to the surface of the drawing sheet corresponds to the circumferential direction of the mold 6. The mold 6 is arranged such that the axial direction thereof extends in the up/down direction of the vulcanization device 2. Here, for convenience sake, one side in the axial direction of the mold 6 is described as the upper side in the up/down direction, and the other side in the axial direction of the mold 6 is described as the lower side in the up/down direction.

FIG. 1 shows the mold 6 in a closed position in which the multiple segments 24, the upper side plate 26, the lower side plate 28, the upper bead ring 30, and the lower bead ring 32 contact with each other.

Each of the segments 24 includes a tread cavity surface 34, a first contact surface 36, and a second contact surface 38. In the up/down direction, the tread cavity surface 34 is positioned at the center of an inner circumferential surface 24a of the segment 24, the first contact surface 36 is positioned at the upper end portion of the segment 24, and the second contact surface 38 is positioned at the lower end portion of the segment 24. The segment 24 is attached to the corresponding sector 14.

The shape of the upper side plate 26 is a ring shape. The upper side plate 26 has a side cavity surface 26a, an outer circumferential surface 26b, and an inner circumferential surface 26c. The side cavity surface 26a faces downward. The outer circumferential surface 26b faces outward in the radial direction. The inner circumferential surface 26c faces inward in the radial direction. The upper side plate 26 is positioned on the inner side in the upper end portion of the segment 24. The outer circumferential surface 26b contacts with the first contact surface 36 of the segment 24.

The shape of the lower side plate 28 is a ring shape.

The lower side plate 28 includes a side cavity surface 28a, an outer circumferential surface 28b, and an inner circumferential surface 28c. The side cavity surface 28a faces upward in the axial direction. The outer circumferential surface 28b faces outward in the radial direction. The inner circumferential surface 28c faces inward in the radial direction. The lower side plate 28 is positioned on the inner side in the lower end portion of the segment 24. The outer circumferential surface 28b contacts with the second contact surface 38 of the segment 24. The outer diameter of the outer circumferential surface 28b is set to be equal to the outer diameter of the outer circumferential surface 26b described above.

The shape of the upper bead ring 30 is a ring shape. The upper bead ring 30 includes a bead cavity surface 30a, an outer circumferential surface 30b, and an inner side surface 30c. The bead cavity surface 30a is formed between the outer circumferential surface 30b and the inner side surface 30c. The outer circumferential surface 30b faces outward in the radial direction. The outer circumferential surface 30b contacts with the inner circumferential surface 26c of the upper side plate 26. Similarly, the shape of the lower bead ring 32 is a ring shape. The lower bead ring 32 includes a bead cavity surface 32a, an outer circumferential surface 32b, and an inner side surface 32c. The bead cavity surface 32a is formed between the outer circumferential surface 32b and the inner side surface 32c. The outer circumferential surface 32b faces outward in the radial direction. The outer circumferential surface 32b contacts with the inner circumferential surface 28c of the lower side plate 28.

The bladder 8 is positioned inward of the mold 6. The bladder 8 can expand by the inside thereof being filled with a medium, and can contract by discharge of the medium. FIG. 1 shows the bladder 8 having expanded by being filled with the medium. The bladder 8 extends along the segment 24, the upper side plate 26, the lower side plate 28, the upper bead ring 30, and the lower bead ring 32. The bladder 8 contacts with the inner side surface 30c of the upper bead ring 30 and the inner side surface 32c of the lower bead ring 32. The mold 6 and the bladder 8 form a cavity 40.

The upper plate 10 is positioned above the upper side plate 26. The upper side plate 26 is attached to the upper plate 10. The upper plate 10 is movable in the up/down direction.

The lower plate 12 is positioned below the lower side plate 28. The lower side plate 28 is attached to the lower plate 12. The lower plate 12 has a slide surface 12a which the sectors 14 contact with and slide on. The slide surface 12a is a flat surface perpendicular to the axial direction (the up/down direction of the vulcanization device 2) of the mold 6.

Each of the sectors 14 has an inner circumferential surface 14a, an outer circumferential surface 14b, and a bottom surface 14c. The segment 24 contacts with the inner circumferential surface 14a. The outer circumferential surface 14b extends downward in the up/down direction so as to be inclined from the inner side toward the outer side in the radial direction.

The segment 24 is attached to the inner side, of the sector 14, in the radial direction. The segments 24 are arranged in the circumferential direction so as to form a ring shape. In the vulcanization device 2, one segment 24 is attached to one sector 14 on a one-to-one basis. However, a plurality of segments 24 may be attached to one sector 14.

The shape of the actuator 16 is a ring shape. The actuator 16 has a tapered inner circumferential surface 16a. The tapered inner circumferential surface 16a extends downward in the up/down direction so as to be inclined from the inner side toward the outer side in the radial direction. The tapered inner circumferential surface 16a and the outer circumferential surfaces 14b of the sectors 14 are formed so as to be slidable on each other.

The upper platen (not illustrated) is positioned on the actuator 16. The actuator 16 is attached to the upper platen.

The upper platen is movable in the up/down direction. The lower platen 20 is positioned below the lower plate 12. The lower plate 12 is attached to the lower platen 20. The lower platen 20 is fixed to the press base (not illustrated).

Figure 2:
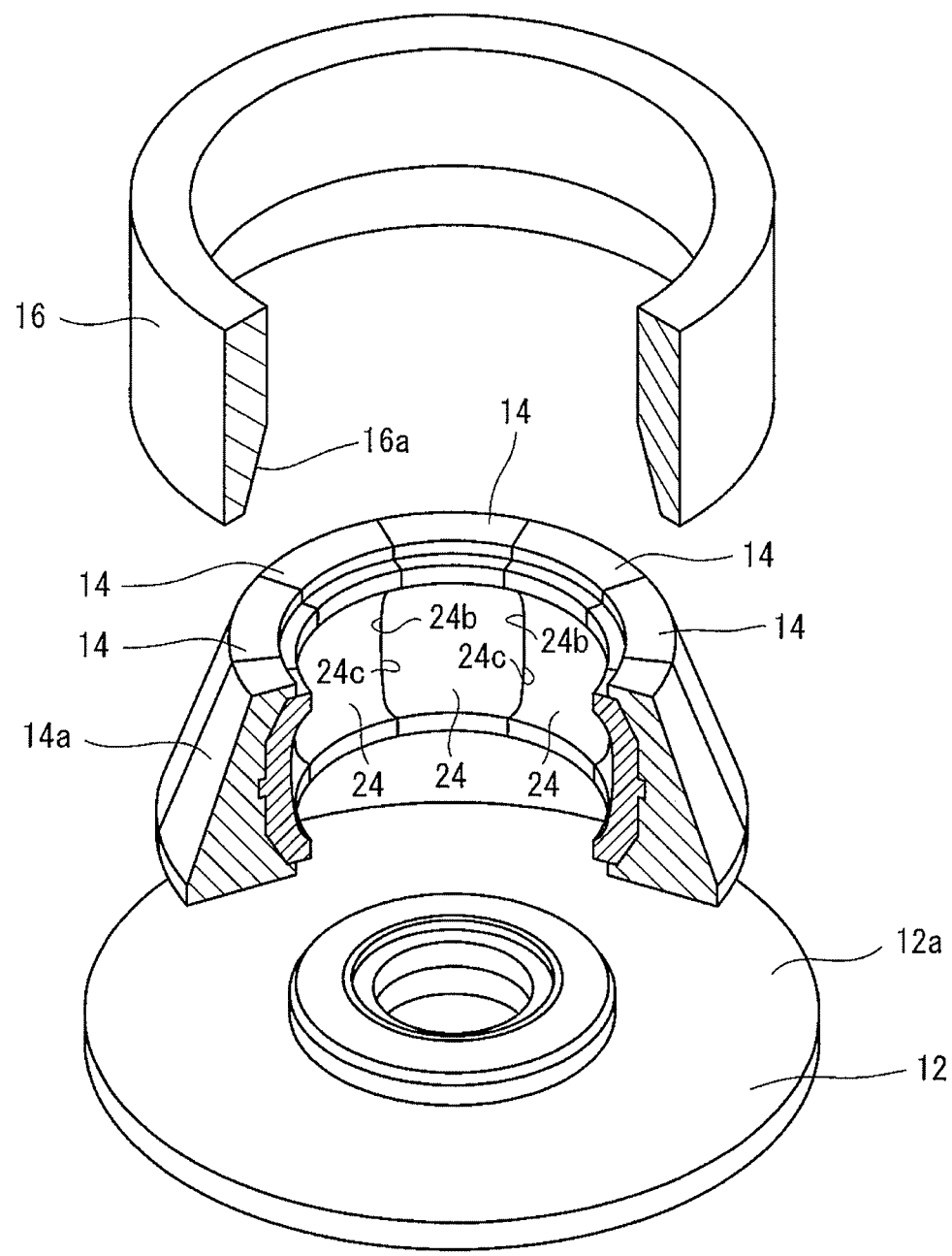
FIG. 2 is an exploded perspective view of a part of the tire vulcanization device in FIG. 1.

As shown in FIG. 2, the multiple sectors 14 in FIG. 1 are arranged in the circumferential direction so as to form a ring shape. One end surface 24b, in the circumferential direction, of each of the segments 24 contacts with the other end surface 24c, in the circumferential direction, of another adjacent segment 24 in the circumferential direction. In this way, the multiple segments 24 are arranged in the circumferential direction so as to form a ring shape.

In the mold 6, nine segments 24 (not illustrated) are arranged in the circumferential direction so as to form a ring shape. The number of the segments 24 that form the ring shape is typically not less than three and not greater than twenty. However, the number of the segments 24 is not limited to a particular number.

Figure 3:
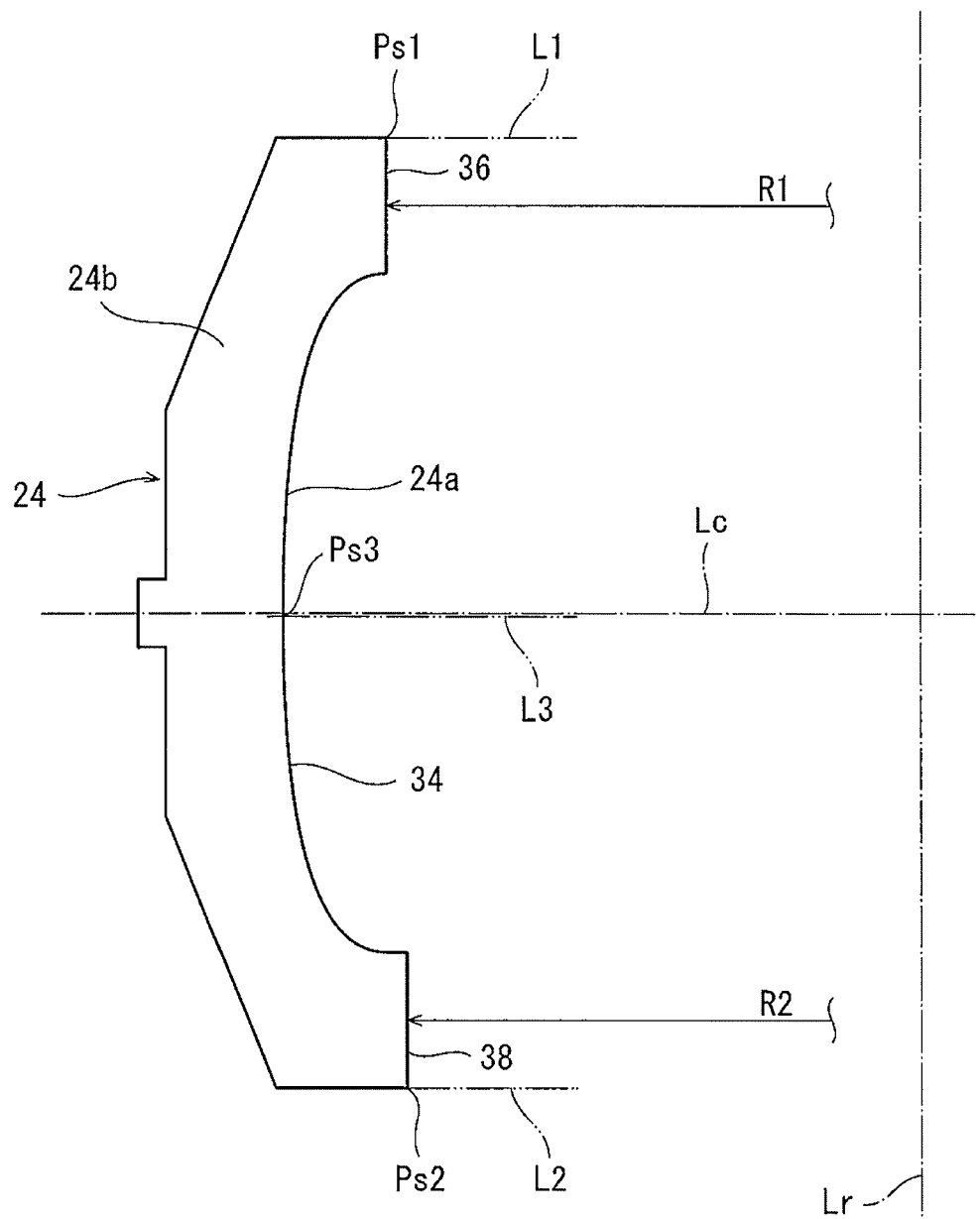
FIG. 3 shows an end surface, of a segment of a mold in FIG. 1, in the circumferential direction.

FIG. 3 shows one end surface 24b, in the circumferential direction, of the segment 24. In FIG. 3, an alternate long and short dash line Lr indicates the axial line of the mold 6. An alternate long and short dash line Lc indicates the equator plane of the mold 6. Reference character Ps1 indicates the upper end, on the end surface 24b, of the first contact surface 36. Reference character Ps2 indicates the lower end, on the end surface 24b, of the second contact surface 38. Reference character Ps3 indicates the point of intersection, on the end surface 24b, of the tread cavity surface 34 and the equator plane Lc.

An alternate long and two short dashes line L1 indicates a straight line that extends through the upper end Ps1 in the radial direction. An alternate long and two short dashes line L2 indicates a straight line that extends through the lower end Ps2 in the radial direction. An alternate long and two short dashes line L3 indicates a straight line that extends through the point Ps3 of intersection in the radial direction.

A one-headed arrow R1 indicates the radius of the first contact surface 36. The radius R1 is measured as a distance from the axial line Lr to the first contact surface 36. The radius R1 is measured at the center, in the axis direction, of the first contact surface 36. A one-headed arrow R2 indicates the radius of the second contact surface 38. The radius R2 is measured as a distance from the axial line Lr to the second contact surface 38. The radius R2 is measured at the center, in the axis direction, of the second contact surface 38. In the mold 6, the radius R1 of the first contact surface 36 of the segment 24 is larger than the radius R2 of the second contact surface 38.

Figure 4:
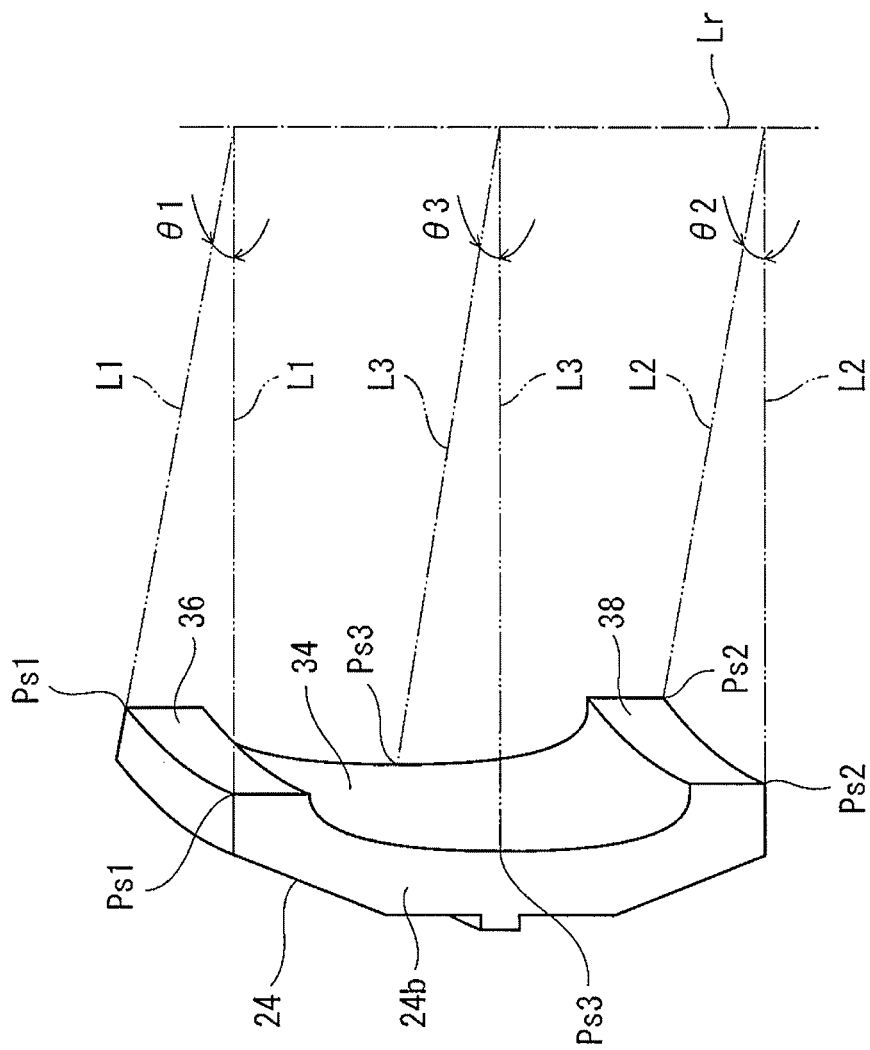
FIG. 4 is a perspective view of the segment in FIG. 3.

As shown in FIG. 4, an upper end Ps1, a lower end Ps2, a point Ps3 of intersection, a straight line L1, a straight line L2, and a straight line L3 are determined for the other end surface 24c in the circumferential direction, similarly to those for the end surface 24b. A double-headed arrow θ1 indicates the central angle of the segment 24 at the first contact surface 36. The central angle θ1 is obtained as an angle formed by a pair of the straight lines L1. A double-headed arrow θ2 indicates the central angle of the segment 24 at the second contact surface 38. The central angle θ2 is obtained as an angle formed by a pair of the straight lines L2. A double-headed arrow θ3 indicates the central angle of the segment 24 at the equator plane. The central angle θ3 is obtained as an angle formed by a pair of the straight lines L3.

A method for producing the tire 4 with use of the vulcanization device 2 will be described. The production method includes a preparing step, a putting-in step, a mold closing step, and a pressurizing and heating step.

In the preparing step, an unvulcanized raw cover is prepared. In the preparing step, the upper side plate 26 is separated from the lower plate 12 (lower side plate 28) in the upper direction, which is not shown. By movement of the actuator 16, the sectors 14 and the segments 24 are separated in the upper direction and the radially outward direction. The adjacent segments 24 are separated from each other in the circumferential direction. In the preparing step, the mold 6 is in an open position.

In the putting-in step, the raw cover is put in the mold 6 in the open position. The raw cover is arranged in the mold 6 in the open position.

In the mold closing step, the upper side plate 26 approaches the lower plate 12. By movement of the actuator 16, the sectors 14 and the segments 24 move downward. Further, the sectors 14 and the segments 24 move inward in the radial direction of the mold 6. The end surface 24b of the segment 24 contacts with the end surface 24c of the adjacent segment 24 in the circumferential direction. The segments 24 are formed into a ring shape. The first contact surface 36 of each of the segments 24 arranged in the ring shape contacts with the outer circumferential surface 26b of the upper side plate 26. The second contact surface 38 contacts with the outer circumferential surface 28b of the lower side plate 28. In this way, the mold 6 is set to be in the closed position shown in FIG. 1.

In the pressurizing and heating step, the raw cover is pressurized and heated in the mold 6. As a result, the raw cover is vulcanized, whereby the tire 4 is obtained from the raw cover.

Figure 5A:
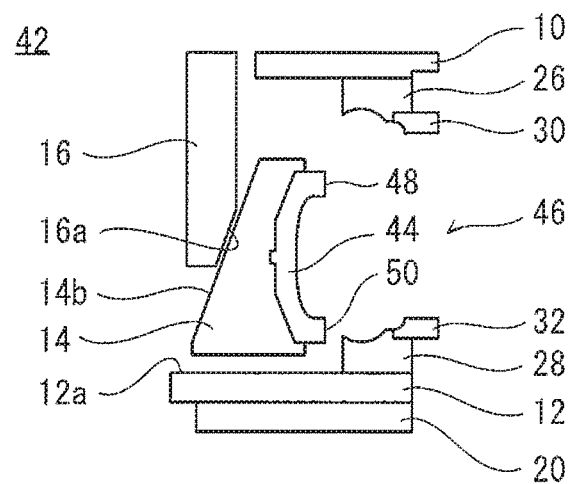
FIG. 5A is a diagram showing a usage state of a tire vulcanization device of a comparative example.
Figure 5B:
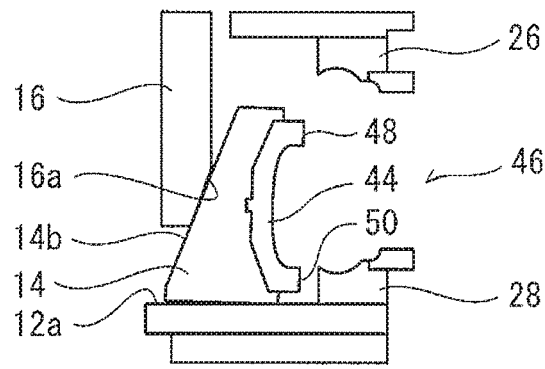
FIG. 5B is a diagram showing another usage state of the tire vulcanization device.
Figure 5C:
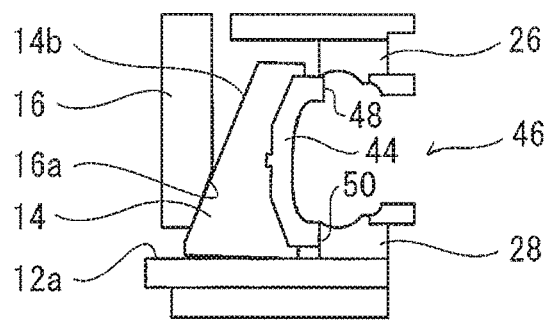
FIG. 5C is a diagram showing still another usage state of the tire vulcanization device.

FIGS. 5A to 5C show the usage states of a conventional vulcanization device 42. The vulcanization device 42 is different from the vulcanization device 2 in that the vulcanization device 42 includes conventional segments 44 instead of the segments 24. Other components are the same therebetween.

In the vulcanization device 42, the sectors 14 and the actuator 16 are connected such that the tapered inner circumferential surface 16a is slidable on the outer circumferential surfaces 14b. For example, a groove is formed along the outer circumferential surface 14b, and a projection is formed on the tapered inner circumferential surface 16a. The projection is movable along the groove, and is prevented from being removed from the groove.

In FIG. 5A, the sector 14 is disposed on the upper side by the actuator 16. The sector 14 is separated from the slide surface 12a of the lower plate 12. In FIG. 5B, the actuator 16 moves downward. The sector 14 contacts with the slide surface 12a. In FIG. 5C, the actuator 16 further moves downward. Thus, the sector 14 slides inward in the radial direction on the slide surface 12a.

In each of the usage states in FIGS. 5B and 5C, the tapered inner circumferential surface 16a of the actuator 16 presses the outer circumferential surface 14b of the sector 14. As a result of this pressing, the sector 14 moves inward in the radial direction, while sliding on the slide surface 12a. At this time, the sector 14 moves such that one side in the axial direction is slightly inclined inward in the radial direction as compared to the other side in the axial direction.

In the segment 44, the radius of a first contact surface 48 is equal to the radius of a second contact surface 50. The position of the first contact surface 48 is the same, in the radial direction, as the position of the second contact surface 50. Accordingly, the first contact surface 48 is likely to interfere with the upper side plate 26, as shown in FIG. 5C. In FIG. 5C, for easy understanding, the interference is emphasized as compared to an actual state.

The interference tends to increase non-uniformity of gaps between the segments 44 and gaps between the segments 44 and the upper and lower side plates 26, 28. The non-uniformity of gaps causes a large overflow spew in the tire 4.

The non-uniformity of gaps tends to increase non-uniformity of wear among the first contact surface 48, the second contact surface 50, one end surface 44b in the circumferential direction, and the other end surface 44c in the circumferential direction. The non-uniformity of wear further increases overflow spew. The non-uniformity of gaps deteriorates the durability of a mold 46.

Figure 6A:
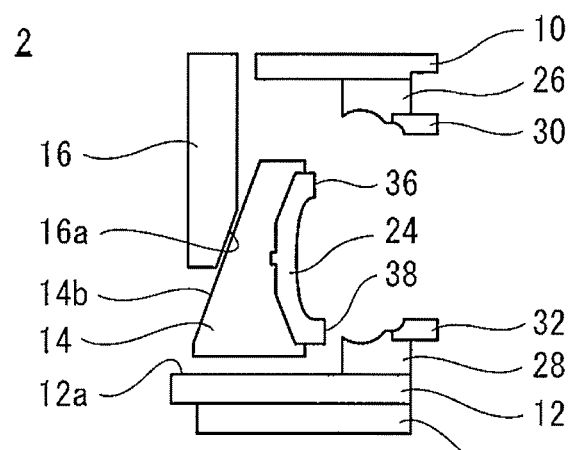
FIG. 6A is a diagram showing a usage state of the tire vulcanization device in FIG. 1.
Figure 6B:
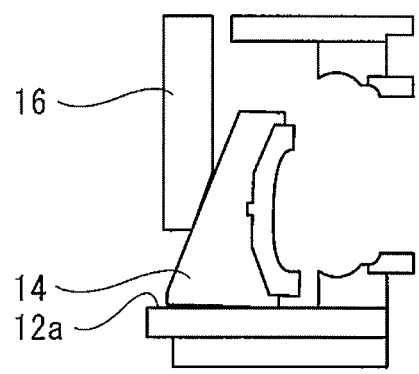
FIG. 6B is a diagram showing another usage state of the tire vulcanization device in FIG. 1.
Figure 6C:
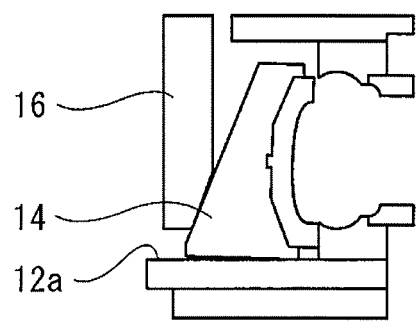
FIG. 6C is a diagram showing still another usage state of the tire vulcanization device in FIG. 1.

FIGS. 6A to 6C show the usage states of the vulcanization device 2 according to the present invention. The usage states in FIGS. 6A to 6C are shown so as to correspond to the usage states of the vulcanization device 42 in FIGS. 5A to 5C, respectively.

In the vulcanization device 2, the radius R1 of the first contact surface 36 is greater than the radius R2 of the second contact surface 38. As a result, the second contact surface 38 is positioned inward of the first contact surface 36 in the radial direction. As shown in FIG. 6C, the first contact surface 36 is inhibited from interfering with the upper side plate 26. As a result of the inhibition of interference, the mold 6 is smoothly closed.

From the viewpoint of inhibiting the interference, the difference (R1−R2) between the radius R1 and the radius R2 is preferably not less than 0.05 mm, more preferably greater than 0.05 mm, and particularly preferably not less than 0.06 mm. On the other hand, in the mold 6 in which the difference (R1−R2) is excessively great, the occurrence of overflow spew is increased conversely. From the viewpoint of inhibiting the occurrence of overflow spew, the difference (R1−R2) is preferably not greater than 0.10 mm, more preferably less than 0.10 mm, and particularly preferably not greater than 0.09 mm.

The inhibition of interference contributes to uniformization of gaps between the segments 24, and gaps between the segments 24 and the upper and the lower side plates 26, 28. In the mold 6 in the closed position, gaps between the segments 24, and the upper and the lower side plates 26, 28 are made uniform. This uniformization of the gaps inhibits occurrence of overflow spew. The mold 6 contributes to improvement of the outer appearance of the tire 4. Further, the uniformization of the gaps inhibits the non-uniformity of wear among the first contact surface 36, the second contact surface 38, and the one end surface 24b and the other end surface 24c in the circumferential direction. The inhibition of non-uniformity of wear contributes to improvement of the durability of the mold 6.

In each of the segments 24 of the mold 6, the central angle θ1 is smaller than the central angle θ2. In the state shown in FIG. 6C, interference between the one end surface 24b, in the circumferential direction, of the segment 24 and the other end surface 24b, in the circumferential direction, of the adjacent segment 24 is inhibited. As a result of the inhibition of the interference, the mold 6 is smoothly closed. In the mold 6, gaps are further made uniform.

The central angle θ of the segment 24 is gradually reduced, toward the upper end Ps1 which is one end in the axial direction, from the lower end Ps2 which is the other end in the axial direction. In the segment 24, the end surface 24b and the end surface 24c are brought into contact with each other on the lower side before they contact with each other on the upper side. Accordingly, the positions of the segments 24 are adjusted in the circumferential direction. Thereafter, the end surface 24b and the end surface 24c contact with each other on the upper side. Deviation of positions of the segments 24 is inhibited in the circumferential direction. As a result of the inhibition of the deviation in position, gaps are made uniform.

In each of the segments 24, the difference (θ3−θ1) between the central angle θ3 and the central angle θ1 is greater than the difference (θ2−θ3) between the central angle θ3 and the central angle θ2. In the segments 24, the end surface 24b of the segment 24 and the end surface 24c of the adjacent segment 24 more easily contact with each other on the lower side. Accordingly, the positions of the segments 24 are more easily adjusted in the circumferential direction. On the other hand, the end surface 24b and the end surface 24c contact with each other on the upper side after they contact with each other on the lower side. Accordingly, occurrence of non-uniformity of gaps caused by interference is further inhibited.

In the mold 6 in which the difference (θ2−θ1) between the central angle θ2 and the central angle θ1 is great, interference between the segments 24 adjacent to each other in the circumferential direction is inhibited. The inhibition of the interference contributes to uniformization of gaps in the mold 6. From this view point, the difference (θ2−θ1) is preferably not less than 0.003°, and more preferably not less than 0.004°. On the other hand, in the mold 6 in which the difference (θ2−θ1) is small, a gap at the upper end is small. When the gap is made small, occurrence of overflow spew can be inhibited. From this view point, the difference (θ2−θ1) is preferably not greater than 0.006°, and more preferably not greater than 0.005°.

EXAMPLES

Hereinafter, effects of the present invention will become apparent according to examples. However, the present invention should not be restrictively construed on the basis of the description of examples.

Example 1

The vulcanization device shown in FIG. 1 was prepared. Tires were vulcanized with use of the vulcanization device. In the vulcanization device, the difference (R1−R2) between the radius R1 and the radius R2 of each segment, and the difference (θ2−θ1) between the central angle θ1 and the central angle θ2 of each segment were as indicated in Table 1. The tire was produced with use of the vulcanization device.

Comparative Example 1

Conventional segments were prepared. The difference (R1−R2) and the difference (θ2−θ1) in each of the segments were as indicted in Table 1. Except for the difference in the segment, Comparative Example 1 was the same as Example 1.

Example 2

Except that the difference (R1−R2) and the difference (θ2−θ1) in each segment were as indicated in Table 1, Example 2 was the same as Example 1.

[Evaluation of Matching Rate]

The outer appearances of the produced tires were inspected. In the inspection, the occurrence rate of outer-appearance-poor products necessary to address overflow spew, with respect to the number of the produced tires, was inspected. In the matching rate in Table 1, the occurrence rates are indicated as indexes with the index of Comparative Example 1 being 100. The greater the index is, the lower the occurrence rate of outer-appearance-poor products is and the better the evaluation is.

[Evaluation of Durability]

In production of tires, a mold which has the matching rate satisfying the predetermined criterion, is repaired. After being repaired, the mold is used for production of tires again. The number of tires which were produced until the mold was repaired after the mold was used for the first time, was obtained. In the durability in Table 1, the number of the produced tires is indicated as an index with the index of Comparative Example 1 being 100. The greater the index is, the greater the number of the produced tires is and the better the evaluation is. The greater the index is, the more excellent the productivity is.

TABLE 1

| | Evaluation Result | | |
|---|---|---|---|
| | Comparative Example 1 | Example 1 | Example 2 |
| R1 − R2 (mm) | 0.00 | 0.08 | 0.10 |
| θ2 − θ1 (°) | 0.001 | 0.0045 | 0.006 |
| Matching rate (index) | 100 | 169 | 113 |
| Durability (index) | 100 | 174 | 110 |

As indicated in Table 1, the evaluation is higher in examples than in comparative example. This evaluation result clearly indicates that the present invention is superior.

The method described above is widely applicable to tires obtained by vulcanization using a container-mold-type mold.

The foregoing description is in all aspects illustrative, and various modifications can be devised without departing from the essential features of the invention.

What is claimed is:

1. A tire mold comprising:
   multiple segments arranged in a circumferential direction so as to form a ring shape; and
   a pair of side plates positioned on an inner side in a radial direction, at end portions, in an axial direction, of the multiple segments, wherein
   the side plates each have an outer circumferential surface which contacts with the multiple segments arranged in the ring shape,
   an outer diameter of the outer circumferential surface of one of the side plates is equal to an outer diameter of the outer circumferential surface of the other of the side plates,
   each of the segments includes a first contact surface which contacts with the outer circumferential surface of one of the side plates, and a second contact surface which contacts with the outer circumferential surface of the other of the side plates,
   a radius R1 of the first contact surface is greater than a radius R2 of the second contact surface, and
   a difference between a radius of the outer circumferential surface of the one of the side plates and the radius R1 of the first contact surface is greater than a difference between a radius of the outer circumferential surface of the other of the side plates and the radius R2 of the second contact surface.

2. The tire mold according to claim 1, wherein
   a central angle θ1, at the first contact surface, of each segment is less than a central angle θ2, at the second contact surface.

3. The tire mold according to claim 2, wherein
   a central angle θ of each segment is gradually reduced toward one end, in the axial direction, at which the first contact surface is positioned, from the other end, in the axial direction, at which the second contact surface is positioned.

4. The tire mold according to claim 2, wherein
   a difference (θ3−θ1) between a central angle θ3, at an equator plane, of each segment and the central angle θ1 is greater than a difference (θ2−θ3) between the central angle θ3 and the central angle θ2.

5. The tire mold according to claim 3, wherein
   a difference (θ3−θ1) between a central angle θ3, at an equator plane, of each segment and the central angle θ1 is greater than a difference (θ2−θ3) between the central angle θ3 and the central angle θ2.

6. The tire mold according to claim 2, wherein
   a difference (θ2−θ1) between the central angle θ2 and the central angle θ1 is not less than 0.003° and not greater than 0.006°.

7. The tire mold according to claim 3, wherein
   a difference (θ2−θ1) between the central angle θ2 and the central angle θ1 is not less than 0.003° and not greater than 0.006°.

8. The tire mold according to claim 4, wherein
   a difference (θ2−θ1) between the central angle θ2 and the central angle θ1 is not less than 0.003° and not greater than 0.006°.

9. The tire mold according to claim 5, wherein
   a difference (θ2−θ1) between the central angle θ2 and the central angle θ1 is not less than 0.003° and not greater than 0.006°.

10. The tire mold according to claim 1, wherein
    a difference (R1−R2) between the radius R1 and the radius R2 is not less than 0.05 mm and not greater than 0.10 mm.

11. The tire mold according to claim 2, wherein
    a difference (R1-R2) between the radius R1 and the radius R2 is not less than 0.05 mm and not greater than 0.10 mm.

12. The tire mold according to claim 3, wherein
    a difference (R1-R2) between the radius R1 and the radius R2 is not less than 0.05 mm and not greater than 0.10 mm.

13. The tire mold according to claim 4, wherein
    a difference (R1-R2) between the radius R1 and the radius R2 is not less than 0.05 mm and not greater than 0.10 mm.

14. The tire mold according to claim 5, wherein
    a difference (R1-R2) between the radius RI and the radius R2 is not less than 0.05 mm and not greater than 0.10 mm.

15. The tire mold according to claim 6, wherein
    a difference (R1-R2) between the radius R1 and the radius R2 is not less than 0.05 mm and not greater than 0.10 mm.

16. The tire mold according to claim 7, wherein
    a difference (R1-R2) between the radius R1 and the radius R2 is not less than 0.05 mm and not greater than 0.10 mm.

17. The tire mold according to claim 8, wherein
    a difference (R1-R2) between the radius R1 and the radius R2 is not less than 0.05 mm and not greater than 0.10 mm.

18. The tire mold according to claim 9, wherein
a difference (R1-R2) between the radius R1 and the radius R2 is not less than 0.05 mm and not greater than 0.10 mm.

19. A method for producing a tire, the method comprising:
a putting-in step of putting a raw cover in a mold; and
a pressurizing and heating step of pressurizing and heating the raw cover in the mold to obtain a tire from the raw cover, wherein
the mold includes
  multiple segments arranged in a circumferential direction so as to form a ring shape, and
  a pair of side plates positioned on an inner side in a radial direction, at end portions, in an axial direction, of the multiple segments,
the side plates each have an outer circumferential surface which contacts with the multiple segments arranged in the ring shape,
the outer diameter of the outer circumferential surface of the one of the side plates is equal to an outer diameter of the outer circumferential surface of the other of the side plates,
each of the segments includes a first contact surface which contacts with the outer circumferential surface of one of the side plates, and a second contact surface which contacts with the outer circumferential surface of the other of the side plates,
a radius R1 of the first contact surface is greater than a radius R2 of the second contact surface, and
a difference between a radius of the outer circumferential surface of the one of the side plates and the radius R1 of the first contact surface is greater than a difference between a radius of the outer circumferential surface of the other of the side plates and the radius R2 of the second contact surface.

\* \* \* \* \*